(12) United States Patent
Wang

(10) Patent No.: US 8,889,794 B2
(45) Date of Patent: Nov. 18, 2014

(54) RESIN COMPOSITIONS FOR EXTRUSION COATING

(75) Inventor: Jian Wang, Rosharon, TX (US)

(73) Assignee: Dow Global Technologies LLC, Midland, MI (US)

( * ) Notice: Subject to any disclaimer, the term of this patent is extended or adjusted under 35 U.S.C. 154(b) by 554 days.

(21) Appl. No.: 13/337,626

(22) Filed: Dec. 27, 2011

(65) Prior Publication Data

US 2013/0164552 A1 Jun. 27, 2013

(51) Int. Cl.
*B32B 27/32* (2006.01)

(52) U.S. Cl.
USPC ............................ 525/240; 525/528; 428/523

(58) Field of Classification Search
USPC ........................................................ 525/240
See application file for complete search history.

(56) References Cited

U.S. PATENT DOCUMENTS

| | | | |
|---|---|---|---|
| 4,486,552 A | 12/1984 | Niemann | |
| 4,599,392 A | 7/1986 | McKinney et al. | |
| 5,582,923 A | 12/1996 | Kale et al. | |
| 5,583,923 A | 12/1996 | Hoy et al. | |
| 5,773,155 A | 6/1998 | Kale et al. | |
| 5,777,155 A | 7/1998 | Sato et al. | |
| 2006/0281866 A1 | 12/2006 | Oswald et al. | |
| 2011/0003099 A1 | 1/2011 | Vinck | |
| 2011/0003940 A1 | 1/2011 | Karjala et al. | |
| 2012/0277380 A1 | 11/2012 | Karjala et al. | |

FOREIGN PATENT DOCUMENTS

| | | |
|---|---|---|
| WO | 02072691 A1 | 9/2002 |
| WO | 2012/061168 A1 | 5/2012 |

OTHER PUBLICATIONS

PCT/US2012/071821, Written Opinion of the International Searching Authority.

*Primary Examiner* — Doris Lee

(57) ABSTRACT

A composition of matter suitable for use in extrusion coating applications is disclosed. The composition comprises a blend of particular LLDPE with particular LDPE. The LLDPE has the following characteristics: a density in the range of from 0.89 g/cc to 0.97 g/cc; an MWD less than 2.8; a melt index ($I_2$) in the range of 4.0 to 25 g/10 min; a Comonomer Distribution Constant in the range of from greater than from 45 to 400; and a vinyl unsaturation of less than 0.12 vinyls per one thousand carbon atoms present in the backbone of the ethylene-based polymer composition. The LDPE has a melt index ($I_2$) in the range of 0.1 to 15 g/10 min, and has a melt strength which satisfies the inequality:

Log Melt strength (cN)>1.14−0.6×Log $I_2$(g/10 min, 190° C.)

20 Claims, No Drawings

RESIN COMPOSITIONS FOR EXTRUSION COATING

FIELD OF THE INVENTION

This invention pertains to polyethylene extrusion compositions. In particular, the invention pertains to ethylene polymer extrusion compositions having high drawdown and substantially reduced neck-in. The invention also pertains to a method of making the ethylene polymer extrusion composition and a method for making an extrusion coated article, an article in the form of an extrusion profile and an article in the form of an extrusion cast film.

BACKGROUND AND SUMMARY OF THE INVENTION

It is known that low density polyethylene (LDPE) made by high-pressure polymerization of ethylene with free-radical initiators as well as homogeneous or heterogeneous linear low density polyethylene (LLDPE) and ultra low density polyethylene (ULDPE) made by the copolymerization of ethylene and α-olefins with metallocene or Ziegler coordination (transition metal) catalysts at low to medium pressures can be used, for example, to extrusion coat substrates such as paper board, paper, and/or polymeric substrates; to prepare extrusion cast film for applications such as disposable diapers and food packaging; and to prepare extrusion profiles such as wire and cable jacketing. However, although LDPE generally exhibits excellent extrusion processability and high extrusion drawdown rates, LDPE extrusion compositions lack sufficient abuse resistance and toughness for many applications. For extrusion coating and extrusion casting purposes, efforts to improve abuse properties by providing LDPE compositions having high molecular weights (i.e., having melt index, $I_2$, less than about 2 g/10 min) are not effective since such compositions inevitably have too much melt strength to be successfully drawn down at high line speeds.

While LLDPE and ULDPE extrusion compositions offer improved abuse resistance and toughness properties and MDPE (medium density polyethylene) extrusion compositions offer improved barrier resistance (against, for example, moisture and grease permeation), these linear ethylene polymers exhibit unacceptably high neck-in and draw instability; they also exhibit relatively poor extrusion processability compared to pure LDPE. One proposal commonly used in the industry is to blend LDPE with LLDPE. With LDPEs currently used, large amounts (e.g. more than 60%) of LDPE must be used in order to achieve the required neck-in. In some circumstances, the availability of LDPE may be limited, or there may be other reasons for desiring a lower level of LDPE, such as improving the physical characteristics, without unduly increasing neck-in. It has been discovered that the use of particular Linear PEs allow an improved combination of physical properties with good processability as evidenced by low neck-in, while using less LDPE (for example, less than 50%, 45% or even 40% of the LDPE).

It is generally believed that neck-in and melt strength are inversely related. Thus, in references such as U.S. Pat. Nos. 5,582,923 and 5,777,155 to Kale et al. (each of which is hereby incorporated by reference in its entirety), adding LLDPE to improve physical toughness came at the expense of extrudability factors such as increased neck-in. Thus in the extrusion coating industry, current practice is to utilize lower melt index LDPE for extrusion on equipment with narrower die widths and relatively low maximum take off rates. Such low melt index autoclave LDPE resins provide low neck-in (less than about 2.5 inches (1.25 inch for each side)) and sufficient draw-down speed. This is typically with older equipment. Faster equipment, typically with wider die widths and improved internal deckling, is supplied with higher melt index autoclave LDPE, which unfortunately, tends to yield greater neck-in.

In the preferred practice of the present invention the neck-in is less than approximately two and a half inches (1.25" per side) at a haul-off rate of approximately 880 feet/minute. The neck-in generally decreases with increasing haul-off rates, making neck-in particularly problematic when using older equipment which is limited in the haul off rates obtainable. The practical range of melt index is from about 3 to about 30 g/10 min in most coating applications, and the compositions of the present invention can cover this entire range. It is desirable that the maximum operating speed of the extrusion coating equipment not be limited by the properties of the resin being used. Thus it is desirable to use resin which exhibits neither draw instability nor breaking before the maximum line speed is reached. It is even more desirable that such resin exhibit very low neck-in, less than about 2.5 inches. The resins provided in this invention exhibit low neck-in and excellent draw stability while the draw-down capability required is obtained by selecting the correct melt index. Typically the melt index of the overall blend is in the range of 4-20 g/10 min. In both situations the neck-in can be less than 2.5 inches.

LLDPE in the preferred blends for use in making the compositions of the present invention have the following characteristics: a density in the range of from 0.89 g/cc to 0.97 g/cc; an MWD less than 2.8; a melt index ($I_2$) in the range of 4.0 to 25 g/10 min; a Comonomer Distribution Constant in the range of from greater than from 45 to 400; and a vinyl unsaturation of less than 0.12 vinyls per one thousand carbon atoms present in the backbone of the ethylene-based polymer composition.

The high pressure low density type of polymer has a melt index ($I_2$) in the range of 0.1 to 15 g/10 min, and has a melt strength which satisfies the inequality:

$$\text{Log Melt strength (cN)} > 1.14 - 0.6 \times \text{Log } I_2(\text{g}/10 \text{ min, } 190°\text{ C.})$$

Another aspect of the present invention is a process for improving extrusion coating performance by using the resins of the present invention.

DESCRIPTION OF THE PREFERRED EMBODIMENTS

The following terms shall have the given meaning for the purposes of this invention:

"Haul-Off" is defined herein to mean the speed at which the substrate is moving, thus stretching or elongating a molten polymer extrudate.

"Drawdown" is defined as the haul-off speed at which the molten polymer breaks from the die or the speed at which edge instability was noted.

"Melt strength" measures elongational flow behavior of polymer melt, and it is determined by the force required to draw a molten polymer strand through a pair of counter-rotating wheels at a constant acceleration rate. The polymer strand can be fed by a capillary rheometer at a constant output rate at a temperature above the polymer's melting temperature. Melt strength, measured by the force at the plateau prior to strand breakage, is reported herein in centi-Newtons (cN), and it is typically determined using a Gottfert Rheotens 71.97 at 190° C.

"Neck-in" is defined herein as the difference between the die width and the extrudate width on the fabricated article. The neck-in values reported herein are determined at a haul off rate of 440 feet/minute which yields a 1 mil coating thickness as well as at a haul off rate of 880 feet/minute which yields a 0.5 mil coating thickness at an extrusion rate of approximately 250 lbs/hr, using a 3.5-inch diameter, 30:1 L/D Black-Clawson extrusion coater equipped with a 30 inch wide die deckled to 24 inches and having a 25-mil die gap.

The term "polymer", as used herein, refers to a polymeric compound prepared by polymerizing monomers, whether of the same or a different type. The generic term polymer thus embraces the term "homopolymer", usually employed to refer to polymers prepared from only one type of monomer as well as "copolymer" which refers to polymers prepared from two or more different monomers.

The term "LDPE" may also be referred to as "high pressure ethylene polymer" or "highly branched polyethylene" and is defined to mean that the polymer is partly or entirely homopolymerized or copolymerized in autoclave or tubular reactors at pressures above 14,500 psi (100 MPa) with the use of free-radical initiators, such as peroxides (see for example U.S. Pat. No. 4,599,392, herein incorporated by reference).

The term "LLDPE" is defined to mean any linear or substantially linear polyethylene copolymer. The LLDPE can be made by any process such as gas phase, solution phase, or slurry or combinations thereof.

Testing Methods

Melt Index

Melt index, or $I_2$, is measured in accordance with ASTM D 1238, Condition 190° C./2.16 kg, and is reported in grams eluted per 10 minutes. The $I_{10}$ was measured in accordance with ASTM D 1238, Condition 190° C./10 kg, and was reported in grams per 10 minutes.

Density

Compression molded samples for density measurement are prepared according to ASTM D 4703. Density measurements are performed following ASTM D792, Method B within 1 hour of molding.

Dynamic Mechanical Spectroscopy

Resins were compression-molded into 3 mm thick×25 mm diameter circular plaque at 177° C. for 5 minutes under 10 MPa pressure in air. The sample is then taken out of the press and placed on the counter to cool.

A constant temperature frequency sweep is performed using a TA Instruments "Advanced Rheometric Expansion System (ARES)", equipped with 25 mm parallel plates, under a nitrogen purge. The sample is placed on the plate and allowed to melt for five minutes at 190° C. The plaques are then closed to 2 mm, the sample trimmed, and then the test is started. The method has an additional five minute delay built in, to allow for temperature equilibrium. The experiments are performed at 190° C. over a frequency range of 0.1-100 rad/s at five points per decade interval. The strain amplitude is constant at 10%. The stress response is analyzed in terms of amplitude and phase, from which the storage modulus (G'), loss modulus (G"), complex modulus (G*), dynamic viscosity ($\eta$*), and tan ($\delta$) or tan delta are calculated.

Melt Strength

Melt strength measurements were conducted on a Gottfert Rheotens 71.97 (Goettfert Inc.; Rock Hill, S.C.), attached to a Gottfert Rheotester 2000 capillary rheometer. The melted sample (about 25 to 30 grams) was fed into the barrel (L=300 mm, Diameter=12 mm) of the Goettfert Rheotester 2000 capillary rheometer, equipped with a flat entrance angle (180 degrees) of length of 30 mm, diameter of 2.0 mm, and an aspect ratio (length/diameter) of 15. After equilibrating the samples at 190° C. for 10 minutes, the piston was run at a constant piston speed of 0.265 mm/second, which corresponds to a wall shear rate of 38.2 s$^{-1}$ at the given die diameter. The standard test temperature was 190° C. The sample was drawn uniaxially to a set of accelerating nips located 100 mm below the die, with an acceleration of 2.4 mm/s$^2$. The tensile force was recorded as a function of the take-up speed of the nip rolls. Melt strength was reported as the plateau force (cN) before the strand broke. The following conditions were used in the melt strength measurements: plunger speed=0.265 mm/second; wheel acceleration=2.4 mm/s$^2$; capillary diameter=2.0 mm; capillary length=30 mm; and barrel diameter=12 mm.

High Temperature Gel Permeation Chromatography

The Gel Permeation Chromatography (GPC) system consists of a Waters (Milford, Mass.) 150 C. high temperature chromatograph (other suitable high temperatures GPC instruments include Polymer Laboratories (Shropshire, UK) Model 210 and Model 220) equipped with an on-board differential refractometer (RI) (other suitable concentration detectors can include an IR4 infra-red detector from Polymer ChAR (Valencia, Spain)). Data collection is performed using Viscotek TriSEC software, Version 3, and a 4-channel Viscotek Data Manager DM400. The system is also equipped with an on-line solvent degassing device from Polymer Laboratories (Shropshire, United Kingdom).

Suitable high temperature GPC columns can be used such as four 30 cm long Shodex HT803 13 micron columns or four 30 cm Polymer Labs columns of 20-micron mixed-pore-size packing (MixA LS, Polymer Labs). The sample carousel compartment is operated at 140° C. and the column compartment is operated at 150° C. The samples are prepared at a concentration of 0.1 grams of polymer in 50 milliliters of solvent. The chromatographic solvent and the sample preparation solvent contain 200 ppm of trichlorobenzene (TCB). Both solvents are sparged with nitrogen. The polyethylene samples are gently stirred at 160° C. for four hours. The injection volume is 200 microliters. The flow rate through the GPC is set at 1 ml/minute.

The GPC column set is calibrated by running 21 narrow molecular weight distribution polystyrene standards. The molecular weight (MW) of the standards ranges from 580 to 8,400,000, and the standards are contained in 6 "cocktail" mixtures. Each standard mixture has at least a decade of separation between individual molecular weights. The standard mixtures are purchased from Polymer Laboratories. The polystyrene standards are prepared at 0.025 g in 50 mL of solvent for molecular weights equal to or greater than 1,000,000 and 0.05 g in 50 mL of solvent for molecular weights less than 1,000,000. The polystyrene standards were dissolved at 80° C. with gentle agitation for 30 minutes. The narrow standards mixtures are run first and in order of decreasing highest molecular weight component to minimize degradation. The polystyrene standard peak molecular weights are converted to polyethylene molecular weight using Equation 2 (as described in Williams and Ward, *J. Polym. Sci.*, Polym. Letters, 6, 621 (1968)):

$$M_{polyethylene} = A \times (M_{polystyrene})^B \quad \text{(Eq. 2)},$$

where M is the molecular weight of polyethylene or polystyrene (as marked), and B is equal to 1.0. It is known to those of ordinary skill in the art that A may be in a range of about 0.38 to about 0.44 and is determined at the time of calibration using a broad polyethylene standard. Use of this polyethylene calibration method to obtain molecular weight values, such as the molecular weight distribution (MWD or $M_w/M_n$), and related statistics (generally refers to conventional GPC or cc-GPC results), is defined here as the modified method of Williams and Ward.

Long Chain Branching frequency (LCBf); Zero Shear Viscosity Ratio (ZSVR) (including the determination of the creep zero shear viscosity and weight average molecular weight); the Comonomer Distribution Constant (CDC); and the levels of vinyl unsaturation are determined as described in WO/2011/002868, and especially PCT/U.S. Ser. No. 11/057,780 hereby incorporated by reference in their entirety.

Description of the Composition

The compositions of the present invention comprise at least two components. The first component, which is a linear low density polyethylene, comprises from 50 to 97% by weight of the composition, preferably greater than or equal to 55, more preferably greater than or equal to 60 percent by weight of the overall composition.

LLDPE in the preferred blends for use in making the compositions of the present invention have the following five characteristics: First, a density in the range of from 0.89 g/cm$^3$, preferably 0.90 g/cm$^3$, more preferably 0.905 g/cm$^3$ up to 0.97 g/cm$^3$, preferably 0.96 g g/cm$^3$, more preferably 0.93 g/cm$^3$. Second, the LLDPE should have an MWD less than 2.8, preferably in the range of from 1.9 to 2.5, more preferably in the range of from 2.0 to 2.3. Third, the LLDPE should have a melt index ($I_2$) in the range of from 4.0 g/10 min, preferably 6 g/10 min, more preferably 8 g/10 min, up to 25 g/10 min, preferably 20 g/10 min, more preferably 15 g/10 min. Fourth, the LLDPE should have a Comonomer Distribution Constant in the range of from greater than from 45, preferably 50, more preferably 55 up to 400, preferably 200, more preferably 150. Fifth, the LLDPE should have a vinyl unsaturation of less than 0.12 vinyls per one thousand carbon atoms present in the backbone of the ethylene-based polymer composition. Preferably the level of vinyl unsaturation should be in the range of from 0.01 to 0.1 or even 0.08 vinyl groups per one thousand carbon atoms present in the backbone of the ethylene-based polymer composition. Preferably the LLDPE in the preferred blends of the present invention will also have a Long Chain Branching frequency (LCBf) of from 0.02 to 3 long chain branches per 1000 carbon atoms, preferably 0.02 to 1, or more preferably from 0.02 to 0.5 long chain branches per 1000 carbon atoms. Preferably the LLDPE in the preferred blends of the present invention will also have a Zero Shear Viscosity Ratio (ZSVR) of at least 1.4, preferably at least 1.5. Although there is no upper limit for the ZSVR, in general the LLDPE will have a ZSVR of less than 20 or even less than 10.

LLDPE meeting these parameters can be obtained according to the processes described in WO/2011/002868.

The compositions of the present invention also comprise a second polyethylene resin which comprises a high pressure low density polyethylene. The second polyethylene comprises from 3 to 50 percent by weight of the total composition, alternatively from 10 to 40 percent, more preferably from 15 to 35 percent. In general the more of this resin which can be included, the less of the LLDPE component which is needed to achieve good neck-in properties. Such LDPE materials are well known in the art and include resins made in autoclave or tubular reactors. The preferred LDPE for use as the second polyethylene has a density in the range of from 0.915 to 0.930 g/cm$^3$, preferably from 0.916 to 0.925, more preferably from 0.917 to 0.920 g/cm$^3$. The preferred LDPE for use in the second polyethylene has a melt strength which satisfies the inequality Log Melt Strength (cN)>1.14−0.6 Log I2 (g/10 min, 190° C.); preferably Log Melt Strength (cN)>1.16−0.6× Log $I_2$, more preferably Log Melt Strength (cN)>1.18−0.6× Log $I_2$.

The overall composition preferably has a melt index of from 4 to 20 g/10 min, preferably from 6 to 15/g/10 min, and an overall density of from 0.90 to 0.96 g/cm$^3$.

Additives such as antioxidants (e.g., hindered phenolics such as Irganox® 1010 or Irganox® 1076 supplied by Ciba Geigy), phosphites (e.g., Irgafos® 168 also supplied by Ciba Geigy), cling additives (e.g., PIB), Standostab PEPQ™ (supplied by Sandoz), pigments, colorants, fillers, and the like can also be included in the ethylene polymer extrusion composition of the present invention, to the extent that they do not interfere with the high drawdown and substantially reduced neck-in discovered by Applicants. These compositions preferably contain no or only limited amounts of antioxidants as these compounds may interfere with adhesion to the substrate. The article made from or using the inventive composition may also contain additives to enhance antiblocking and coefficient of friction characteristics including, but not limited to, untreated and treated silicon dioxide, talc, calcium carbonate, and clay, as well as primary, secondary and substituted fatty acid amides, chill roll release agents, silicone coatings, etc. Other additives may also be added to enhance the anti-fogging characteristics of, for example, transparent cast films, as described, for example, by Niemann in U.S. Pat. No. 4,486,552, the disclosure of which is incorporated herein by reference. Still other additives, such as quaternary ammonium compounds alone or in combination with ethylene-acrylic acid (EAA) copolymers or other functional polymers, may also be added to enhance the antistatic characteristics of coatings, profiles and films of this invention and allow, for example, the packaging or making of electronically sensitive goods. Other functional polymers such as maleic anhydride grafted polyethylene may also be added to enhance adhesion, especially to polar substrates.

The preferred blends for making the polymer extrusion compositions of this invention can be prepared by any suitable means known in the art including tumble dry-blending, weigh feeding, solvent blending, melt blending via compound or side-arm extrusion, or the like as well as combinations thereof.

The inventive extrusion composition can also be blended with other polymer materials, such as polypropylene, high pressure ethylene copolymers such as ethylene vinylacetate (EVA), ethylene ethylacrylate (EEA), and ethylene acrylic acid (EAA) and the like, ethylene-styrene interpolymers, so long as the necessary rheology and molecular architecture as evidenced by multiple detector GPC are maintained. The composition can be used to prepare monolayer or multilayer articles and structures, for example, as a sealant, adhesive or tie layer. The other polymer materials can be blended with the inventive composition to modify processing, film strength, heat seal, or adhesion characteristics as is generally known in the art.

The ethylene polymer extrusion compositions of this invention, whether of monolayer or multilayered construction, can be used to make extrusion coatings, extrusion profiles and extrusion cast films as is generally known in the art. When the inventive composition is used for coating purposes or in multilayered constructions, substrates or adjacent material layers can be polar or nonpolar including for example, but not limited to, paper products, metals, ceramics, glass and various polymers, particularly other polyolefins, and combinations thereof. For extrusion profiling, various articles can potentially be fabricated including, but not limited to, refrigerator gaskets, wire and cable jacketing, wire coating, medical tubing and water piping, where the physical properties of the composition are suitable for the purpose. Extrusion cast film made from or with the inventive composition can also potentially be used in food packaging and industrial stretch wrap applications.

EXPERIMENTAL

In order to demonstrate the effectiveness of the compositions of the present invention the following experiments are run.

Four different linear low density polyethylene resins were used. Resins A, B, and D are produced in a dual reactor solution process with constrained geometry catalysts used in both reactors. Resin C is produced in a dual reactor solution process with constrained geometry catalyst in one reactor and a Ziegler Natta catalyst in a second reactor. Resins A-D are more completely described in Table 1.

The LDPE used in each Example is a high pressure low density polyethylene made in an autoclave reactor having a density of 0.918 g/cm$^3$ and a melt index ($I_2$) of 8 g/10 min, which is commercially available from the Dow Chemical Company under the designation LDPE 722.

Blending

The resins were blended as follows for characterization. The LLDPE component and LDPE component are compounded in an 18 mm twin screw extruder (micro-18). The twin screw extruder used is a Leistritz machine controlled by Haake software. The extruder has five heated zones, a feed zone, and a 3 mm strand die. The feed zone is cooled by flowing river water, while the remaining zones 1-5 and die are electrically heated and air cooled to 120, 135, 150, 190, 190, and 190° C. respectively. The pellet blend components are combined in a plastic bag and tumble blended by hand. After preheating the extruder, the load cell and die pressure transducers are calibrated. The drive unit for the extruder is run at 200 rpm which results by gear transfer to a screw speed of 250 rpm. The dry blend is then fed (6-8 lbs/hr) to the extruder through a twin auger K-Tron feeder model # K2VT20 using pellet augers. The hopper of the feeder is padded with nitrogen and the feed cone to the extruder is sealed with foil to minimize air intrusion to minimize possible oxygen degradation of the polymer. The resulting strand is water quenched, dried with an air knife, and pelletized with a Conair chopper. These blends where then characterized and the results are presented in Table 2.

Extrusion Coating

The same resins, in the same ratios, were then dry blended for use in extrusion coating. All coating experiments are performed on a Black-Clawson extrusion coating/lamination line. The amount of neck-in (the difference in actual coating width versus deckle width with a 6" (15 cm air gap) is measured at 440 fpm and 880 fpm resulting in 1 mil and 0.5 mil coatings respectively. Drawdown is the speed at which edge imperfections were noticed or that speed at which the molten curtain completely tears from the die. Although the equipment is capable of haul-off speeds of 3000 fpm, in these experiments the maximum speed used was 1500 fpm. This is normal operation and is done to conserve paper and maximize the number of experiments that can be done on the machine for each roll of paper board purchased. Motor current is also recorded on the 150 horsepower 3½ inch diameter extruder during screw speeds of approximately 90 rpm resulting in 250 lb/h throughput. Blends of the various components are produced by weighing out the pellets according to the ratios listed in Table 3 and then tumble blending samples until a homogeneous blend is obtained (approximately 30 minutes for each sample). The observed neck-in and draw down for each blend is presented in Table 3. As seen in this Table, the Inventive Example exhibited superior neck-in without a decrease in the maximum draw down.

TABLE 1

Properties of LLDPE components.

| Sample Description | Unit | Resin A | Resin B | Resin C | Resin D |
|---|---|---|---|---|---|
| Density | g/cc | 0.907 | 0.912 | 0.914 | 0.914 |
| $I_2$ | g/10 min | 8.4 | 8.4 | 7.2 | 9.3 |
| $I_{10}$ | g/10 min | 53.7 | 84.9 | 76.4 | 144.6 |
| $I_{10}/I_2$ | | 6.4 | 10.1 | 10.7 | 15.6 |
| Eta* (0.1 r/s) | Pa·s | 924 | 1,456 | 1,609 | 1,469 |
| Eta* (1.0 r/s) | Pa·s | 904 | 1,240 | 1,355 | 1,243 |
| Eta* (10 r/s) | Pa·s | 776 | 806 | 878 | 782 |
| Eta* (100 r/s) | Pa·s | 520 | 391 | 410 | 320 |
| Mn (TDGPC conv.) | g/mol | 25,529 | 17,170 | 11,950 | 8,350 |
| Mw (TDGPC conv.) | g/mol | 53,755 | 61,440 | 64,450 | 59,320 |
| Mz (TDGPC conv.) | g/mol | 92,245 | 189,000 | 210,400 | 221,000 |
| Mw/Mn | | 2.11 | 3.58 | 5.39 | 7.10 |
| Mz/Mw | | 1.72 | 3.08 | 3.26 | 3.73 |
| CDC | | 64.2 | 119.0 | 129.1 | 41.9 |
| Total unsaturation | unit/1,000,000 carbon | 62 | 123 | 319 | 65 |
| Zero-shear viscosity | Pa·s | 972 | 1,665 | 1,684 | 1,579 |
| Mw (GPC conv.) | g/mol | 58,807 | 64,957 | 68,326 | 65,018 |
| ZSVR | | 1.66 | 1.97 | 1.66 | 1.87 |

TABLE 2

Blend Characteristics.

| Sample Description | Unit | Inventive 1 70% Resin A + 30% LDPE 722 | Comparative 2 70% Resin B + 30% LDPE 722 | Comparative 3 70% Resin C + 30% LDPE 722 | Comparative 4 70% Resin D + 30% LDPE 722 |
|---|---|---|---|---|---|
| Density (g/cc) | g/cc | 0.912 | 0.9146 | 0.9148 | 0.9149 |
| $I_2$ (g/10 min) | g/10 min | 6.8 | 7.3 | 7.0 | 8.7 |
| $I_{10}$ (g/10 min) | g/10 min | 49.2 | 66.3 | 68.55 | 110.8 |

TABLE 2-continued

Blend Characteristics.

| Sample Description | Unit | Inventive 1 70% Resin A + 30% LDPE 722 | Comparative 2 70% Resin B + 30% LDPE 722 | Comparative 3 70% Resin C + 30% LDPE 722 | Comparative 4 70% Resin D + 30% LDPE 722 |
|---|---|---|---|---|---|
| $I_{10}I_2$ | | 7.2 | 9.1 | 9.8 | 12.7 |
| Melt strength | cN | 4.0 | 3.6 | 3.0 | 2.2 |
| Eta* (0.1 r/s) | Pa·s | 1,382 | 2,053 | 1,983 | 1,733 |
| Eta* (1.0 r/s) | Pa·s | 1,188 | 1,559 | 1,537 | 1,380 |
| Eta* (10 r/s) | Pa·s | 804 | 865 | 884 | 799 |
| Eta* (100 r/s) | Pa·s | 439 | 369 | 377 | 316 |

TABLE 3

Neck-in, drawdown at extrusion coating line for the blends.

| Sample Description | Unit | Inventive 1 70% Resin A + 30% LDPE 722 | Comparative 2 70% Resin B + 30% LDPE 722 | Comparative 3 70% Resin C + 30% LDPE 722 | Comparative 4 70% Resin D + 30% LDPE 722 |
|---|---|---|---|---|---|
| Neck-in @ 440 fpm | inches | 3 | 3.38 | 3.50 | 4.50 |
| Neck-in @ 880 fpm | inches | 2.5 | 3.00 | 3.13 | 3.88 |
| Drawdown | fpm | >1500 | 1400 | 980 | >1500 |

Although the invention has been described in considerable detail through the preceding description and examples, this detail is for the purpose of illustration and is not to be construed as a limitation on the scope of the invention as it is described in the appended claims. It should be understood that it is expressly contemplated that the following claims may be combined in any order, unless such combination would result in a claimed structure containing incompatible recitations. All patents, patent applications and other references identified above are incorporated herein by reference, to the extent allowed by law.

The following embodiments are considered within the scope of the invention, and applicants reserve the right to amend the claims or to file one or more additional applications to specifically claim any of these embodiments which are not already expressly recited in the current listing of the claims.

What is claimed is:

1. A composition of matter comprising:
   c. from about 97 to about 50 percent by weight of the composition, of a Linear PE having
      i. a density in the range of from 0.89 g/cc to 0.97 g/cc,
      ii. an Mw/Mn less than 2.8
      iii. a melt index ($I_2$) in the range of 4.0 to 25 g/10 min
      iv. a Comonomer Distribution Constant in the range of from 45 to 400,
      v. a vinyl unsaturation of less than 0.12 vinyls per one thousand carbon atoms present in the backbone of the ethylene-based polymer composition; and
   d. from about 3 to about 50 percent by weight of the composition of a high pressure low density type polyethylene resin having a melt index ($I_2$) in the range of 0.1 to 15 g/10 min, and having a melt strength which satisfies the inequality Log Melt strength (cN)>1.14−0.6×Log $I_2$(g/10 min, 190° C.)

wherein the MI of the composition of matter is in the range of from 4 g/10 minutes to 20 g/10 min.

2. The composition of matter of claim 1 wherein the Linear PE has an MWD of at least 1.8.

3. The composition of matter of claim 1 wherein the Linear PE has a density in the range of 0.905 to 0.93 g/cc.

4. The composition of matter of claim 1 wherein the Linear PE has an MWD in the range of 2.0 to 2.3.

5. The composition of matter of claim 1 wherein the Linear PE has a melt index of 8 to 15 g/10 min.

6. The composition of matter of claim 1 wherein the Linear PE has a Comonomer Distribution Constant of from 55 to 150.

7. The composition of matter of claim 1 wherein the Linear PE has a vinyl unsaturation in the range of from 0.01 to 0.08 vinyls per one thousand carbon atoms present in the backbone of the ethylene-based polymer composition.

8. The composition of matter of claim 1 wherein the Linear PE is further characterized by having a Long Chain Branching frequency (LCBf) of from 0.02 to 3 long chain branches per 1000 carbon atoms.

9. The composition of matter of claim 8 wherein the Linear PE has a Long Chain Branching frequency (LCBf) of from 0.02 to 0.5 long chain branches per 1000 carbon atoms.

10. The composition of matter of claim 1 wherein the Linear PE is further characterized by having a Zero Shear Viscosity Ratio (ZSVR) of at least 1.4.

11. The composition of matter of claim 1 wherein the Linear PE comprises from 97 to 60% by weight of the composition.

12. The composition of matter of claim 1 wherein the high pressure low density type polyethylene resin has a melt strength which satisfies the inequality Log Melt Strength (cN)>1.18−0.6×Log $I_2$.

13. The composition of matter of claim 1 wherein the high pressure low density type polyethylene resin has a melt index in the range of 0.4 to 12 g/10 min.

14. The composition of matter of claim 1 wherein the MI of the composition of matter is in the range of from 4 g/10 minutes to 15 g/10 min.

15. The composition of matter of claim 1 wherein the MI of the composition of matter is in the range of from 7 g/10 minutes to 12 g/10 min.

16. A film made from the composition of matter of any of the preceding claims.

17. The film of claim 16 further comprising one or more additional layers.

18. The composition of matter of claim 1 further comprising one or more additional resin components.

19. The composition of matter of claim 1 further comprising one or more additives.

20. The composition of matter of claim 19 wherein the additive is selected from the group consisting of antioxidants, phosphites, cling additives, pigments, colorants, fillers, or combinations thereof.

* * * * *